United States Patent [19]

Dryla

[11] 3,978,887
[45] Sept. 7, 1976

[54] PROGRAMMABLE WATER VALVE

[75] Inventor: Ronald Dryla, Ta-Ta Creek, Canada

[73] Assignee: Lawrence Peska Associates, Inc., New York, N.Y.; a part interest

[22] Filed: Apr. 7, 1975

[21] Appl. No.: 565,596

[52] U.S. Cl. ............................. 137/624.15; 239/70
[51] Int. Cl.² .................... A01G 27/00; G05D 7/06
[58] Field of Search ................. 239/70; 137/624.11, 137/624.12, 624.13, 624.15, 624.2

[56] References Cited
UNITED STATES PATENTS

| | | | |
|---|---|---|---|
| 3,063,643 | 11/1962 | Roberts | 137/624.11 X |
| 3,379,894 | 4/1968 | Carsten | 239/70 X |
| 3,524,471 | 8/1970 | Bresser | 137/624.12 |

Primary Examiner—Alan Cohan
Attorney, Agent, or Firm—Jack D. Slobod

[57] ABSTRACT

A programmable water valve is provided wherein a twenty-four hour electric time controls the operation of a solenoid actuated valve. An interval of time is selectable in each day for actuation of the valve. In order to provide operation of the valve on alternate days a dividing circuit is used and a selector is provided to select either daily or alternate day operation. An indicator light is provided to indicate when the valve is actuated.

1 Claim, 2 Drawing Figures

PROGRAMMABLE WATER VALVE

BACKGROUND OF THE INVENTION

The present invention relates to water valves and more particularly to a water valve which is programmable to operate within a preselected time interval within 24 hours.

Present apparatus for lawn watering and sprinkling is quite wasteful of water because human intervention is required to supervise the period of time in which watering takes place. Furthermore, the risk that a lawn will brown in hot weather if not watered daily or at least on alternate days has been a source of great inconvenience to homeowners requiring them to be at home to do the watering.

Also it is known that the most efficient use of water is made when a lawn is watered near dusk, rather than during the sunlit hours when th water evaporates quickly. Because of problems in scheduling the homeowner's time, lawns are often watered at improper times leading to further wasting of water.

OBJECTS OF THE INVENTION

It is an object of the present invention to provide a programmable water valve whereby a lawn may be watered automatically during a preselected time interval.

It is a further object of the present invention to provide such a programmable valve with a selector for choosing watering either daily or on alternate days.

SUMMARY OF THE INVENTION

In brief, these and other objects are achieved by providing a twenty-four hour timer which closes a pair of electric contacts during a preselectable time interval. Electric power is applied via the contacts to a solenoid actuated valve which is adapted to be placed in series with a water line. A divider circuit responsive to the timer is provided. The divider circuit closes a second pair of electric contacts during alternate 24 hour periods. A selector switch is provided for either placing or not placing the second pair of contacts in series with the first whereby daily or alternate day operation of the water valve is selected.

Other objects, features and advantages of the present in invention will become apparent from the detailed description when taken in conjunction with the appended drawing wherein.

DETAILED DESCRIPTION

Figures 1, 2:
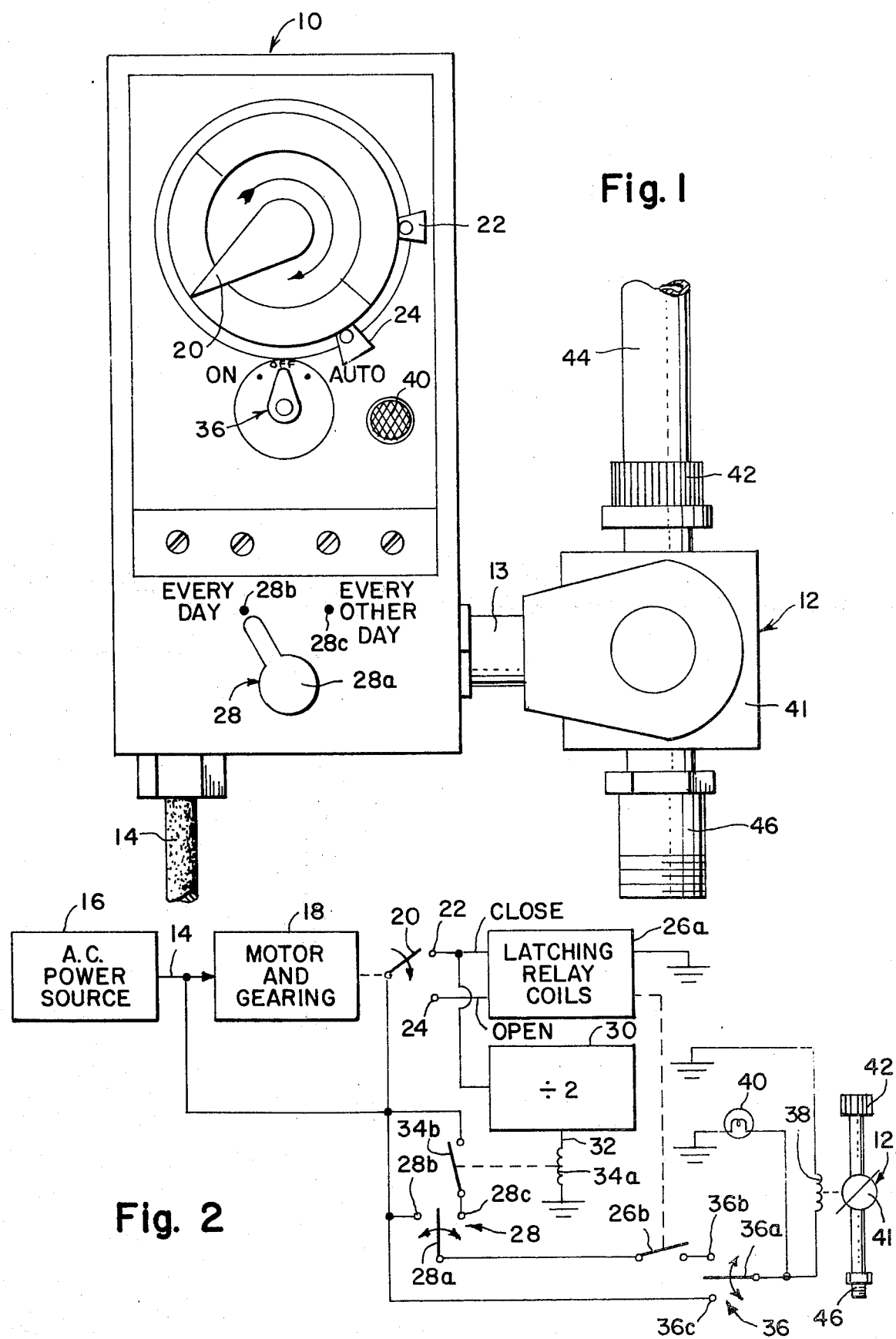
FIG. 1 is a mechanical schematic view of the programmable water valve of the present invention.
FIG. 2 is an electrical schematic view corresponding to FIG. 1.

Referring to FIGS. 1 and 2, the present invention comprises generally a twenty-four hour timer 10 which electrically controls a solenoid actuated valve 12 via an electrical conduit 13. Timer 10 includes an A.C. power cord 14 for the application of a preferably 110 volt A.C. 60 hertz power source 16 to a synchronous motor and associated gearing 18. Motor and gearing 18 rotate contact arm 20 clockwise a full revolution each 24 hours. Tripper contacts 22 and 24, disposed within the sweep of contact arm 20 are angularly adjustable whereby the time each contact is to be hit by arm 20 is selectable.

Contact arm 20 is energized via power cord 14 and thereby causes contact 22 to be energized at one selectable time and contact 24 to be energized at another selectable time. Contacts 22 and 24 are respectively connected to energize closing and opening latching relay coils 26a. As a result, the associated latching relay contact pair 26b is closed when arm 20 hits contact 22 and opened when arm 20 hits contact 24. Consequently, contact pair 26b is closed during a preselected time interval corresponding to the angular sector which contacts 22 and 24 subtend about arm 20.

A selector switch 28 is provided on timer 10 to select either every daily or alternate day operation of valve 12. Single pole double throw selector switch 28 comprises an arm 28a and contacts 28b and 28c. Arm 28a is connected to one side of contact pair 26b. Contact 28b, which corresponds to daily operation, is directly energized by power cord 14 whereby power is transmitted to the opposite side of contacts 26b during said preselected time period if daily operation is selected.

For alternate day operation, contact 22 is fed to index a divide by two circuit 30. The output 32 of circuit 30 energizes a relay coil 34a for closing the associated relay contact pair 34b during alternate 24 hour periods. One side of relay contact pair 34b is energized by power cord 14 and the other side is connected to selector contact 28c corresponding to alternate day operation. Thus when selector arm 28a is placed in contact with contact 28c power is fed to contact pair 26b only on alternate days.

For selecting, constantly on, off, or automatic operation a selector switch 36 is provided. Switch 36 has an arm 36a with a neutral center position corresponding to off operation. In addition there are two contacts 36b and 36c which can be selectably contacted by arm 36a. Arm 36a is connected to the solenoid 38 within solenoid actuated valve 12. Contact 36b, corresponding to off operation is contacted to contact pair 26b while contact 36c, which corresponds to constantly on operation is directly energized by power cord 14.

In order to indicate when water is turned on an indicator lamp 40 is provided in parallel with solenoid 38.

Solenoid 38 actuates water valve 41. The solenoid actuated valve 12 is preferably provided with a female fitting 42 on its inlet end which is adapted to be connected to a garden hose pipe 44 attached to a water faucet. The outlet of the unit is preferably provided with a male fitting 46. Fitting 46 is adapted to receive the inlet end of a garden hose or sprinkling device.

While the present invention has been described with respect to only one embodiment, many others are possible without departing from the spirit and scope of it.

What is claimed is:

1. A timed water valve responsive to a source of electric power comprising: a water inlet; a water outlet; a solenoid actuated valve means for controlling fluid communication between said inlet and said outlet; elctrical timer means having a 24 hour periodic cycle, said timer means including first and second associated switch means which are respectively closed at sequential predetermined first and second times driving each said cycle, said first time being prior to second time in each cycle; a third normally-open switch means; means for connecting said third switch means in a series circuit with said solenoid actuated valve means and said source of electrical power for controlling the turning on of said valve means; means coupled to said first and second switch means and responsive to the closure of said first and second switch means for closing said third switch means for a first time period beginning at said first time and ending at said second time for enabling said valve to be turned on for said first time period in each cycle; a fourth switch means; divide-by-two means coupled to said first switch means and responsive to the closure of said first switch means for closing and opening said fourth switch means on alternate second time periods of 24 hour length beginning at said first time in one said cycle and ending at said first time in the next said cycle; a fifth manually actuatable switch means for selectively placing said fourth switch means in said series circuit, whereby said valve may be selectively turned on for said first time period only in alternate ones of said 24 hour cycles.

* * * * *